United States Patent [19]

Carr

[11] Patent Number: 5,737,140
[45] Date of Patent: Apr. 7, 1998

[54] SIMPLE PULSE POSITION MODULATION CHANNEL/DECODER

[75] Inventor: Thomas Daniel Carr, Leucadia, Calif.

[73] Assignee: Eastman Kodak Company, Rochester, N.Y.

[21] Appl. No.: 660,385

[22] Filed: Jun. 7, 1996

[51] Int. Cl.[6] .................. G11B 5/02; G11B 5/09
[52] U.S. Cl. .................. 360/29; 360/46; 327/37; 375/239
[58] Field of Search .................. 360/46, 39, 29; 375/239; 327/13, 37, 38, 58; 396/319

[56] References Cited

U.S. PATENT DOCUMENTS

| | | | |
|---|---|---|---|
| 4,866,738 | 9/1989 | Wiesmann et al. | 375/239 |
| 4,914,528 | 4/1990 | Aoki et al. | 360/46 |
| 4,928,318 | 5/1990 | Ibe et al. | 455/608 |
| 4,964,139 | 10/1990 | Wash et al. | 375/23 |
| 4,972,276 | 11/1990 | Wadaya et al. | 360/46 |
| 5,007,042 | 4/1991 | Santi | 370/9 |
| 5,313,236 | 5/1994 | Izukawa | 354/106 |
| 5,321,342 | 6/1994 | Kruse | 318/254 |
| 5,430,763 | 7/1995 | Morikura et al. | 375/296 |
| 5,459,679 | 10/1995 | Ziperovich | 360/46 |
| 5,649,249 | 7/1997 | Yoshida | 396/318 |

Primary Examiner—Aristotelis M. Psitos
Assistant Examiner—Regina Y. Neal
Attorney, Agent, or Firm—William F. Noval

[57] ABSTRACT

In a magnetic recording reproducing apparatus, a detecting and decoding circuit comprising:
- a first integrator having an input for receiving a pulse position modulated (PPM) encoded signal reproduced from magnetic media, and having an output;
- a second integrator having an input coupled to said output of said first integrator and having an output;
- a first comparator having a noninverting input connected to the output of said first comparator, an inverting input connected to ground, and an output;
- a reset pulse circuit having an input connected to the output of said first comparator and an output connected to a reset terminal of said second integrator;
- a second comparator having a noninverting input connected to the output of said second integrator, an inverting input connected to ground, and an output; and
- a D flip-flop, having a data input connected to the output of said second comparator, a clock input connected to the output of said reset pulse circuit, and an output which outputs a decoded data signal of said received PPM encoded signal.

3 Claims, 2 Drawing Sheets

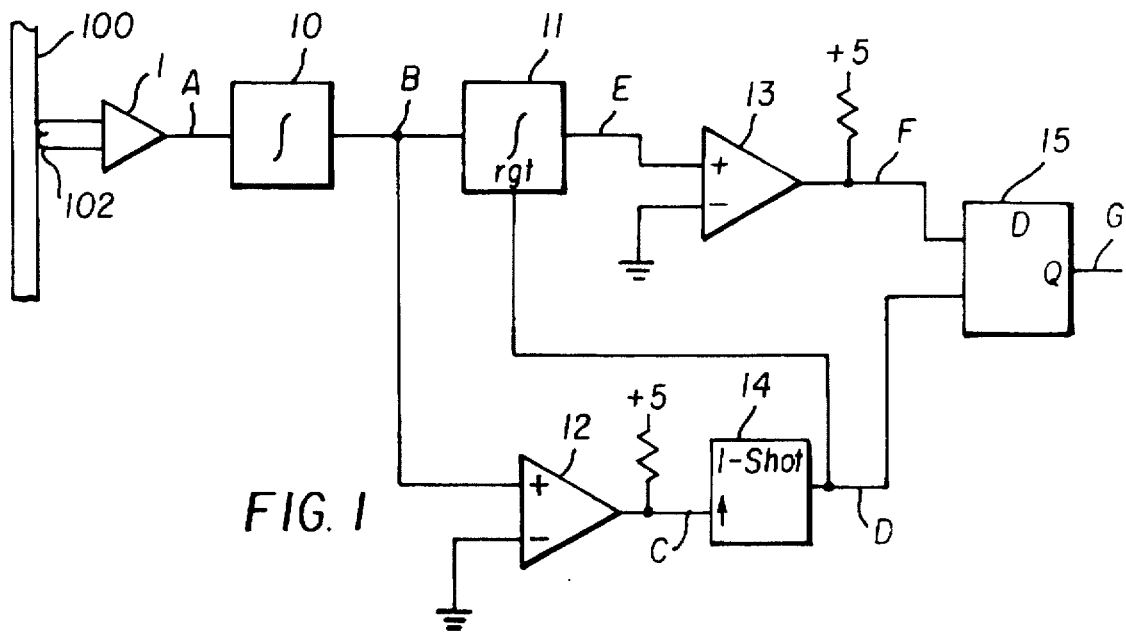
FIG. 1
FIG. 2A
FIG. 2B
FIG. 2C
FIG. 2D
FIG. 2E
FIG. 2F
FIG. 2G 5,737,140

1

SIMPLE PULSE POSITION MODULATION CHANNEL/DECODER

FIELD OF INVENTION

This invention relates in general to magnetic recording/ reproducing systems and more particularly to such a system having a simplified reproduce circuit which produces decoded pulse position modulated data.

BACKGROUND OF THE INVENTION

Traditional magnetic reproduce channels which process signals reproduced from a magnetic media, such as magnetic tape or disc, are typically divided into three sections. The first is an analog section consisting of a pre-amplifier, lowpass filter, and differentiator or integrator. This section produces a signal which has a zero crossing coincident with the location of recorded transitions. The second is a mixed analog/digital section that produces a digital pulse or level change coincident with recorded transitions. The third is a purely digital section that decodes the channel bits and produces the original, de-modulated bit stream. While this approach allows for generic circuits to be used for each section, it does not give the simplest implementation. U.S. Pat. No. 4,964,139 discloses a channel of this type for detecting and decoding a Pulse Position Modulation (PPM) encoded signal. This circuit requires two detectors, one for up pulses and one for down pulses. The channel disclosed in U.S. Pat. No. 5,313,236 requires only one pulse detector, but then must separate the detected data stream into up and down pulses.

There is thus a need for a circuit that combines the three sections described above into a simple circuit that produces decoded PPM data.

SUMMARY OF THE INVENTION

According to the present invention, there is provided a solution to the problems and needs discussed above.

According to a feature of the present invention, there is provided a magnetic recording reproducing apparatus, a detecting and decoding circuit comprising:

- a first integrator having an input for receiving a pulse position modulated (PPM) encoded signal reproduced from magnetic media, and having an output;
- a second integrator having an input coupled to said output of said first integrator and having an output;
- a first comparator having a noninverting input connected to the output of said first comparator, an inverting input connected to ground, and an output;
- a reset pulse circuit having an input connected to the output of said first comparator and an output connected to a reset terminal of said second integrator;
- a second comparator having a noninverting input connected to the output of said second integrator, an inverting input connected to ground, and an output; and
- a D flip-flop, having a data input connected to the output of said second comparator, a clock input connected to the output of said reset pulse circuit, and an output which outputs a decoded data signal of said received PPM encoded signal.

ADVANTAGEOUS EFFECT OF THE INVENTION

The invention has the following advantages.

1. A PPM encoded signal detect and decode circuit is provided that is simple and inexpensive to implement.

2

2. The PPM encoded signal is corrected for DC drift.

3. Noise from a reproduce head and preamplifier is reduced.

BRIEF DESCRIPTION OF THE DRAWINGS

FIG. 1 is a schematic diagram of an embodiment of the present invention.

FIG. 2A–2G is a series of signal waveform diagrams useful in explaining the operation of FIG. 1.

DETAILED DESCRIPTION OF THE INVENTION

Figure 3:
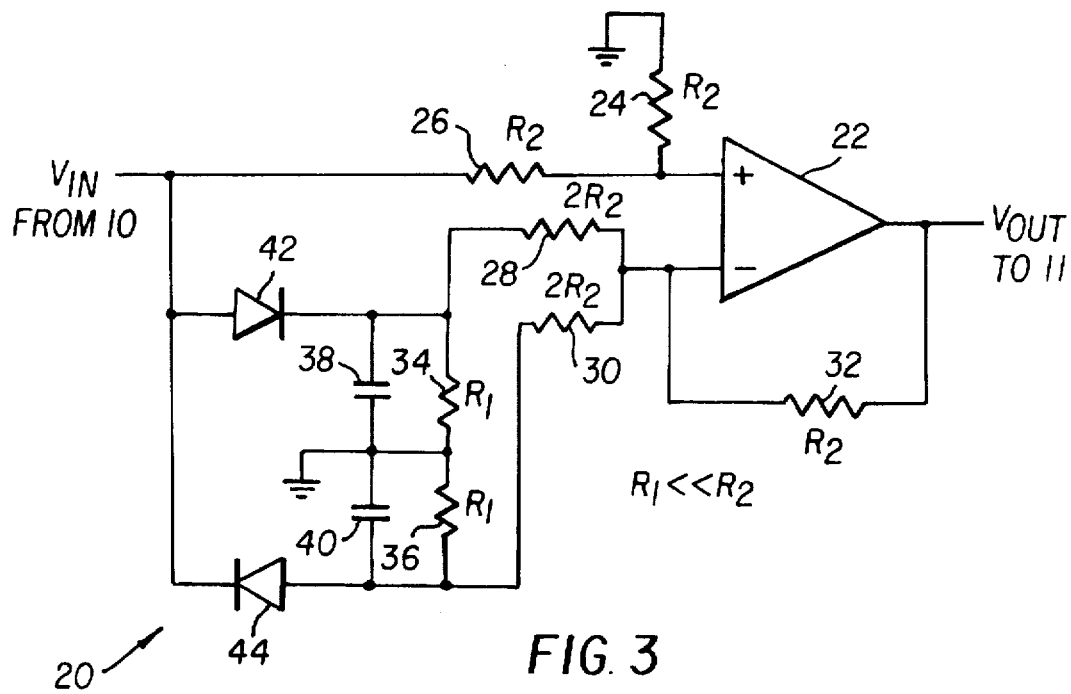
FIG. 3 is a schematic diagram of a feature of the present invention.

FIG. 1 shows a schematic diagram of an embodiment of the present invention. As shown, a pulse position modulation (PPM) encoded signal is reproduced from magnetic media (tape) 100 by magnetic head 102. The signal is amplified by a pre-amplifier 1 connected to a first integrator 10. The first integrator 10 is connected to a second integrator 11 and a first comparator 12. The second integrator 11 has a reset input that forces the output to a nominal voltage. The first comparator 12 is connected to a reset pulse circuit 14 which produces a reset pulse for each positive transition of the first comparator 12. The second integrator 11 is connected to a second comparator 13. The reset pulse circuit 14 and the second comparator 13 are connected to the clock and data inputs of a D flip-flop 15.

The operation of the embodiment of FIG. 1 can be understood by referring to the timing diagram shown in FIG. 2. Trace A shows a PPM encoded signal at the output of the pre-amp 1. This signal is integrated by integrator 10 to produce the waveform of trace B. Zero-crossings of this waveform indicate peaks in waveform A. These zero-crossings are detected by comparator 12, producing the waveform of trace C. Circuit 14 then produces a pulse for each positive transition, marking the clock pulses in the PPM encoded waveform. Integrator 11 integrates while its reset line is low.

As shown on trace E, the output voltage of integrator 11 increases during the clock-to-data pulse time and decreases during the data-to-clock pulse time. If the input bit is a 0, the integrator 11 will end up with a negative output at the end of the bit time –a one ending up with a positive voltage. Comparator 13 detects this level, producing a logical "1" for positive voltages and a logical "0" for negative voltages, as shown on trace F. This output is clocked into flip-flop 15 by the reset pulse generated by circuit 14, giving a decoded data stream as shown on trace G.

It is to be understood that the waveform of trace A could be inverted, with negative-going clock pulses and positive-going data pulses. In such a case, circuit 14 would be set up to produce a reset pulse on negative going transitions and the decoded data would be produced at the /Q output of flip-flop 15.

The circuit described in FIG. 1 can be improved because of the fact that integrator 10 cannot be implemented as an ideal integrator, it will have its pole at a frequency above 0 Hz. As a result, the reference level of the waveform produced by integrator 10 will drift around due to DC components in the input waveform that cannot be faithfully reproduced in the integrator output. A correction circuit is required to restore the reference level to 0V. There are several ways to accomplish this. FIG. 3 shows one implementation of such a circuit. As shown in FIG. 3, DC correction circuit 20 includes op amp 22 having a noninverting input +and an inverting input −and an output, a resistor 26 connected between the output of integrator 10 and the noninverting input, a resistor 24 connected between the noninverting input and ground, and a resistor 32 connected between the inverting input and the output of amplifier 22. A circuit is connected between the output of integrator 10 and the inverting input of amplifier which includes diodes 42,44, capacitors 38,40, resistors 34,36,28,30, which are connected as shown. Resistors 24,26 and 32 have a value $R_2$, resistors 28,30 have a value $2R_2$, and resistors 34,36 have a value $R_1$, where $R_1 << R_2$.

Figure 4:
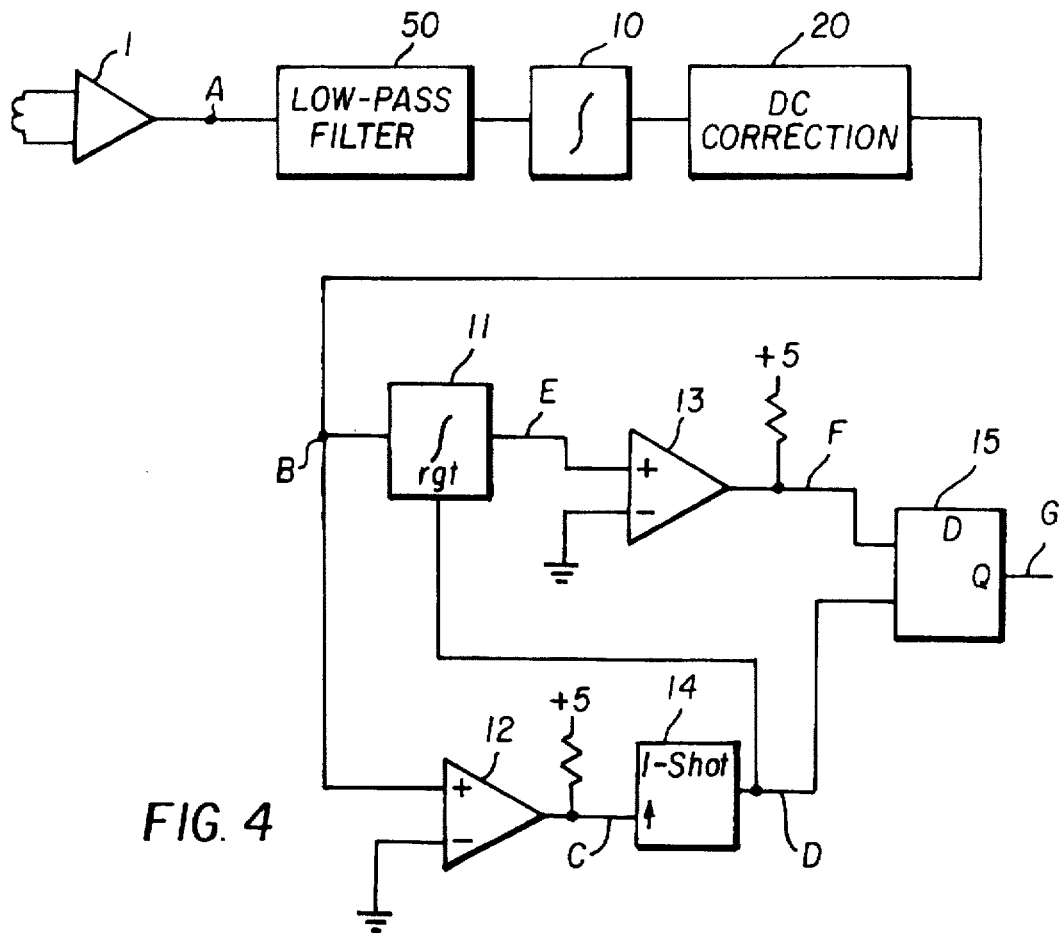
FIG. 4 is a schematic diagram of another feature of the present invention.

The circuit of FIG. 1 can be improved further because noise from the reproduce head and preamp will distort the waveform. A low-pass filter 50 can be inserted between the preamp and the first integrator to reduce the noise contribution. This technique is well known in the art. FIG. 4 shows a circuit including circuit 20 mentioned.

The invention has been described with specific reference to embodiments thereof, but it will be understood that variations and modifications thereof are within the spirit and scope of the invention.

What is claimed is:

1. In a magnetic recording reproducing apparatus, a detecting and decoding circuit comprising:

a first integrator having an input for receiving a pulse position modulated (PPM) encoded signal reproduced from magnetic media, and having an output;

a second integrator having an input coupled to said output of said first integrator and having an output;

a first comparator having a noninverting input connected to the output of said first integrator, an inverting input connected to ground, and an output;

a reset pulse circuit having an input connected to the output of said first comparator and an output connected to a reset terminal of said second integrator;

a second comparator having a noninverting input connected to the output of said second integrator, an inverting input connected to ground, and an output; and a D flip-flop, having a data input connected to the output of said second comparator, a clock input connected to the output of said reset pulse circuit, and an output which outputs a decoded data signal of said received PPM encoded signal.

2. The circuit of claim 1 including a signal envelope correcting circuit to compensate for baseline offsets in the signal waveform output from said first integrator.

3. The circuit of claim 1 including a low pass filter for filtering said PPM encoded signal before it is input to said first integrator.

* * * * *